H. C. PRIEBE.
DRAFT GEAR.
APPLICATION FILED SEPT. 17, 1917.
1,282,939.
Patented Oct. 29, 1918.
2 SHEETS—SHEET 1.
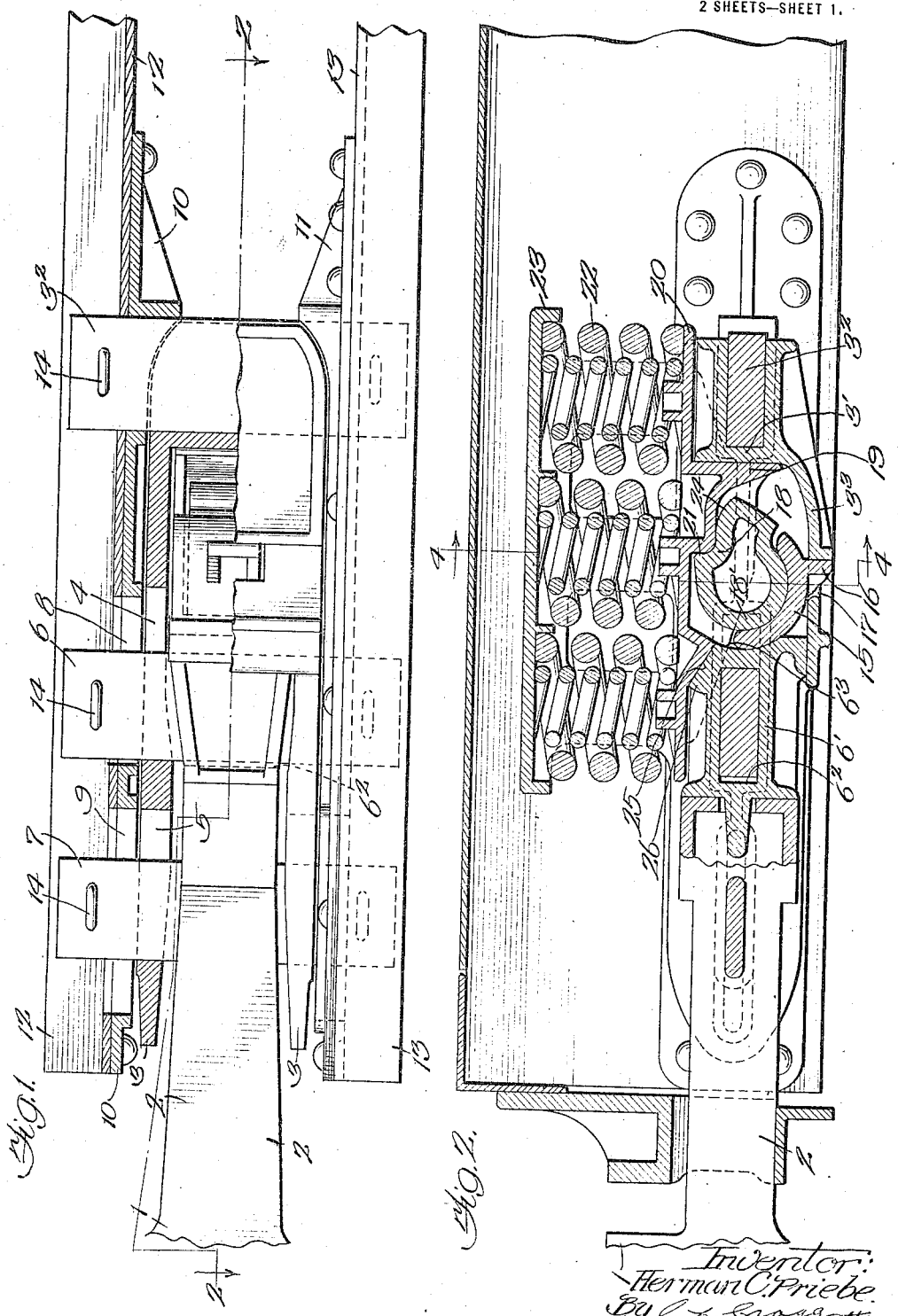
Inventor:
Herman C. Priebe

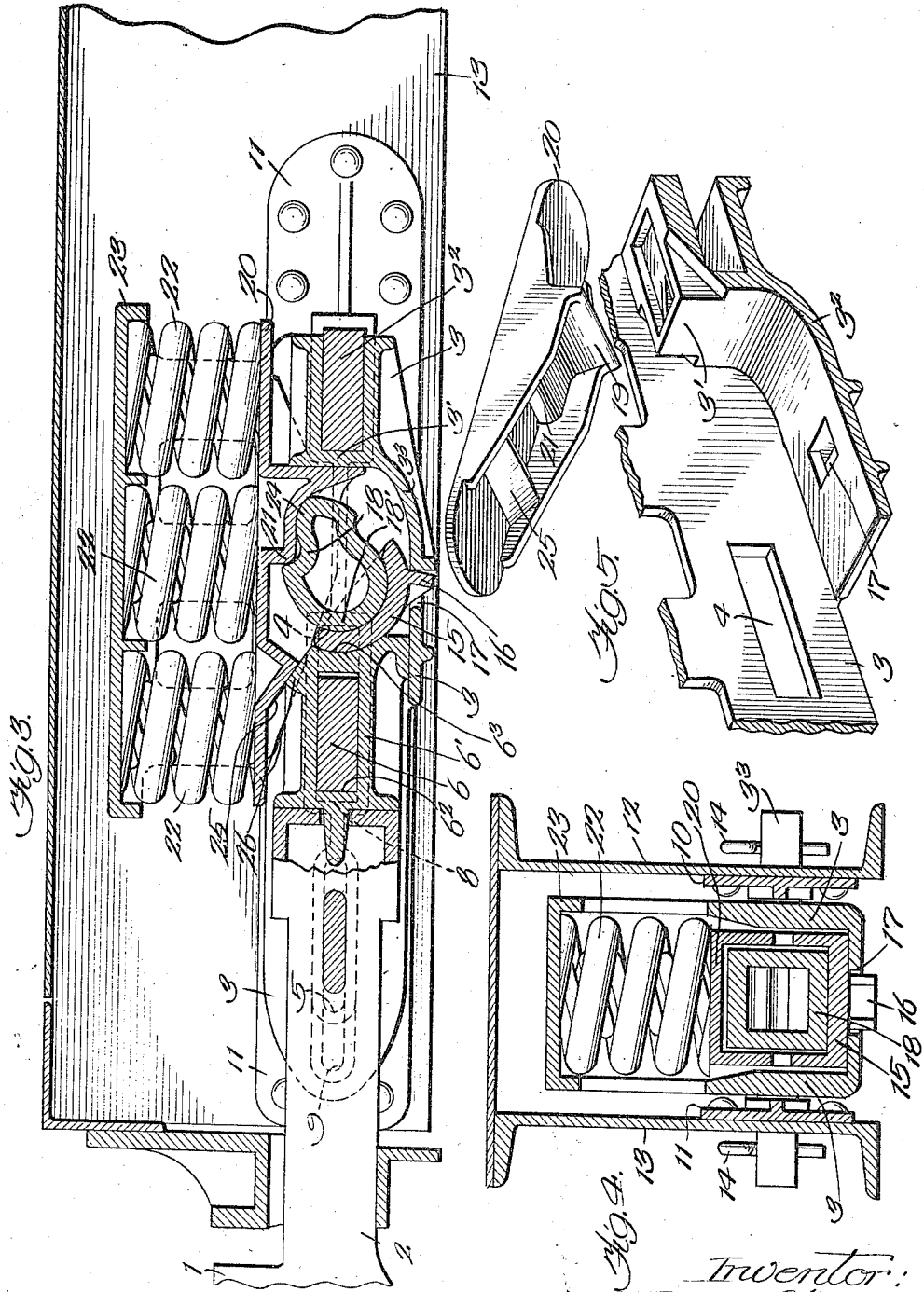

UNITED STATES PATENT OFFICE.

HERMAN C. PRIEBE, OF CHICAGO, ILLINOIS.

DRAFT-GEAR.

1,282,939. Specification of Letters Patent. Patented Oct. 29, 1918.

Application filed September 17, 1917. Serial No. 191,704.

*To all whom it may concern:*

Be it known that I, HERMAN C. PRIEBE, citizen of the United States, residing at Chicago, in the county of Cook and State of Illinois, have invented a certain new and useful Improvement in Draft-Gears, of which the following is a full, clear, concise, and exact description.

My invention relates to friction draft gears employed in the coupling of railway vehicles and has for its object the provision of improved friction producing mechanism entering into the construction of such gears. In carrying out my invention I employ a rotatably mounted friction producing member and mechanism whereby coupler movements will cause the rotation of this friction producing member. In the preferred embodiment of the invention there are two such friction producing members in frictional engagement with each other and in concentric or co-axial relation and mechanism for causing these members to rotate in opposite directions upon sufficient pull or push upon the coupler. By this arrangement given movement of the coupler will be accompanied by greater friction producing motion of each of the rotatable friction producing elements than would be the case if but one such rotatable friction producing element were employed.

I will explain my invention more fully by reference to the accompanying drawings showing the preferred embodiment thereof and in which Figure 1 is a bottom view, partially in section, showing a draft gear constructed in accordance with the invention; Fig. 2 is a view on line 2—2 of Fig. 1; Fig. 3 is a view similar to Fig. 2 showing changed positions of some of the parts; Fig. 4 is a view on line 4—4 of Fig. 2; and Fig. 5 is a perspective view of a portion of the structure, partially in section and showing parts in disarranged positions for the sake of clearness.

Like parts are indicated by similar characters of reference throughout the different figures.

The coupler 1 includes a shank 2 that is connected with the yoke structure in any suitable way. In the embodiment of the invention illustrated the sides of the yoke structure are in the form of straps 3 integrally connected with the inner end piece $3^1$ of the yoke. Openings 4 and 5 are provided in the yoke structure for the reception of keys 6 and 7, the openings permitting the keys to move inwardly from outer positions of the keys and outwardly from inner positions of the keys. The keys also project through openings 8 and 9 in the cheek plates 10 and 11 which are secured to the center sills 12 and 13, the openings 5 registering with the openings 9 and corresponding openings in the center sills when the gear is not under stress, the openings 4 then also registering with the openings 8 and similar openings in the center sills. A follower or member $6^1$ has a transverse opening $6^2$ in which the key 6 fits whereby this key and the follower have accompanying movements that are longitudinal of the gear. The inner key $3^2$ is received within an open slot in the rear end piece $3^1$ that constitutes this portion of the yoke a fork. This key $3^2$ passes through slots in the center sills and cheek plates and is preferably incapable of material movement longitudinally of the gear. This fork structure is claimed in my copending application Serial No. 125,766, filed October 16, 1916.

Cotter pins 14 may be employed to prevent the withdrawal of the keys from the slots in the center sills that receive them.

The follower $6^1$ has an inner rounded transverse edge $6^3$, the curvature at $6^3$ being that of a segment of a cylinder. A transverse turning element 15, in the form of a segment of a tube, has its outer face in contact with the curved face $6^3$ of the follower $6^1$. This turning element 15 has a depending lug 16 passing through an opening 17 in the bottom web $3^3$ that is integrally formed and extends between the straps 3. When the coupler yoke structure 3, $3^1$, $3^3$ is pulled forwardly the web $3^3$ presses upon the lug 16 and forces the segmental turning element 15 to turn from the idle position shown in Fig. 2 upwardly or clockwise upon its horizontal axis that extends transversely of the gear, this turning element being prevented from bodily rising by the motion resisting means, preferably spring mechanism, later to be set forth. Motion retarding friction will arise between the outer face of the turning element 15 and the inner face $6^3$ of the follower $6^1$, these faces of the turning element and follower being of similar curvature or radii, the axes of the curvature $6^3$ and the engaging curved face of the turning element 15 being co-incident. When the pull upon the coupler is sufficiently reduced the spring motion retarding mechanism is effective to turn the turning element 15 downwardly or counter-clockwise toward the idle position shown in Fig. 2. Upon forward pull upon the coupler that is sufficient to turn the turning element 15 upwardly or clockwise this turning element has its axis of rotation maintained fixed with respect to the center sills. When the coupler is subject to buffing strains the turning element 15 will be turned upwardly or clockwise from the idle position illustrated in Fig. 2 and as this turning element turns it will be moved inwardly together with the follower $6^1$ and the coupler structure. As the turning element 15 and the follower $6^1$ move inwardly the yoke structure 3 remains stationary with respect to the center sills, it being understood that when the coupler moves outwardly upon pulling strains that the yoke 3 and the coupler shank 2 move together. The turning element 15 is desirably accompanied by an additional transverse turning element 18 having a portion $18^1$ that is in the form of a segment of a cylinder whose axis is co-incident with the segmental turning element 15, the exterior segmental surface at $18^1$ of the turning element 18 engaging the interior segmental surface of the turning element 15, the engaged curved faces of the turning elements 15 and 18 and the face $6^3$ being of similar radii and co-axial. The turning members and all of the friction faces of the turning members and the faces engaged by the friction faces of the turning members are disposed transversely to the line of draft to produce friction upon any relative movement of either end member or follower toward the other, the frictionally engaged surfaces being in substantially constant engagement.

In a manner to be described, inward bodily movement of the turning element 15 will cause inward bodily movement of the turning element 18 and as the turning element 15 turns upwardly in a clockwise direction the turning element 18 will turn downwardly in a counter-clockwise direction whereby the frictionally engaging faces of the turning elements 15 and 18 will move in opposite directions greatly to increase their relative travel for a given movement of the coupler, an advantage that is present over an arrangement wherein the portion $18^1$ of the turning element has direct engagement with the follower face $6^3$. When sufficient pulling strain is exerted upon the coupler, in addition to having the coupler yoke act upon the turning element 15 to turn it upwardly or clockwise, this coupler yoke also operates upon the turning element 18 to turn it downwardly or counter-clockwise, the coupler yoke applying torque to the turning elements 15 and 18 upon opposite sides of their common axis. In the construction illustrated the coupler yoke exerts turning effort upon the turning element 15 directly and upon the turning element 18 indirectly, there being a depending portion or follower 19 (of the plate 20) interposed between the inner end piece $3^1$ of the coupler yoke and the nose 21 of the turning element 18. This nose 21 is virtually a lug performing for the turning element 18 the function that the lug 16 performs for the turning element 15.

The plate 20 also constitutes a part of the motion resisting mechanism which I employ for checking the relative movement, longitudinally of the gear, between the outer and inner members or followers $6^1$, 19. This motion resisting mechanism is inclusive of vertically arranged coiled springs 22 whose upper ends engage the abutment 23 that is carried by and in fixed relation with the straps 3. The lower ends of these springs 22 engage the aforesaid plate 20 that constitutes an abutment for the lower ends of the springs. When the turning element 18 is moved in a counter-clockwise direction, upon sufficient pull upon the coupler, the nose 24 upon this turning element will press upwardly upon the plate 20 against the motion retarding force of the springs 22. As the plate 20 moves forwardly upon sufficient pull upon the coupler, the transverse wedge face 25 upon the bottom of the plate 20 will ride upwardly upon the transverse wedge face 26 upon the follower $6^1$, the portions 25, 26 coacting also to effect the elevation of the plate 20 against the motion retarding force of the spring 22. When the pull upon the coupler is sufficiently reduced the spring 22 will force the parts to or toward the idle position illustrated in Fig. 2. When the coupler is subject to sufficient pushing strains the wedge portion 26 will move beneath the wedge portion 25 and the nose 24 will move upwardly against the plate 20 against the motion retarding force of the springs 22.

By the construction illustrated motion retarding friction is produced directly between the turning elements or rotatable friction producing members 15, 18; friction is produced between one of these turning elements and the outer follower $6^1$; and friction is produced between the other of these turning elements and the follower 19. Motion retarding friction is also produced between the inner vertical face of the follower 19 and the outer vertical face of the yoke portion $3^1$.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A draft gear including a coupler; inner and outer members actuated thereby and movable with respect to each other longitudinally of the gear; means for resisting the relative movement of said members; and two turning elements rotatable by the coupler in opposite directions, one turning element frictionally engaging one of the aforesaid members and the other turning element frictionally engaging the other of the aforesaid members, the engaging faces of one of said turning elements and one of said members having curvature of substantially the same radii and being substantially co-axial, said turning elements also having frictionally engaged faces of substantially the same radii and that are substantially co-axial with each other and with the aforesaid co-axial faces, said turning elements and the frictionally engaged faces being transverse to the line of draft, the frictionally engaged surfaces being in substantially constant engagement.

2. A draft gear including a coupler; inner and outer members actuated thereby and movable with respect to each other longitudinally of the gear; means for resisting the relative movement of said members; and two turning elements rotatable by the coupler, one turning element frictionally engaging one of the aforesaid members and the other turning element frictionally engaging the other of the aforesaid members, the engaging faces of one of said turning elements and one of said members having curvature of substantially the same radii and being substantially co-axial, said turning elements also having frictionally engaged faces of substantially the same radii and that are substantially co-axial with each other and with the aforesaid co-axial faces, said turning elements and the frictionally engaged faces being transverse to the line of draft, the frictionally engaged surfaces being in substantially constant engagement.

3. A draft gear including a coupler; inner and outer members actuated thereby and movable with respect to each other longitudinally of the gear; means for resisting the relative movement of said members; and two frictionally engaged turning elements rotatable in opposite directions by the coupler, the engaged faces of said turning elements being curved and of similar radii and substantially co-axial, said turning elements and the frictionally engaged faces being transverse to the line of draft, the frictionally engaged surfaces being in substantially constant engagement.

In witness whereof, I hereunto subscribe my name this twelfth day of September, A. D., 1917.

HERMAN C. PRIEBE.

Copies of this patent may be obtained for five cents each, by addressing the "Commissioner of Patents, Washington, D. C."